United States Patent
Smith et al.

(10) Patent No.: US 7,238,266 B2
(45) Date of Patent: Jul. 3, 2007

(54) METHOD AND APPARATUS FOR FLUORINE GENERATION AND RECIRCULATION

(75) Inventors: Donald K. Smith, Belmont, MA (US); Matthew M. Besen, Andover, MA (US); William M. Holber, Winchester, MA (US); Stephen F. Horne, Chelmsford, MA (US)

(73) Assignee: MKS Instruments, Inc., Wilmington, MA (US)

( * ) Notice: Subject to any disclaimer, the term of this patent is extended or adjusted under 35 U.S.C. 154(b) by 544 days.

(21) Appl. No.: 10/313,516

(22) Filed: Dec. 6, 2002

(65) Prior Publication Data

US 2004/0109817 A1 Jun. 10, 2004

(51) Int. Cl.
  *C25B 9/08* (2006.01)
  *B01D 61/46* (2006.01)
  *C25B 1/24* (2006.01)
  *B01D 61/44* (2006.01)

(52) U.S. Cl. .................. 204/266; 204/632; 204/536; 205/619

(58) Field of Classification Search ................ None
  See application file for complete search history.

(56) References Cited

U.S. PATENT DOCUMENTS

| | | | |
|---|---|---|---|
| 3,860,504 A | 1/1975 | Kaudewitz et al. ........... 204/59 |
| 4,545,886 A * | 10/1985 | de Nora et al. ............. 204/252 |
| 4,707,224 A * | 11/1987 | Shabrang .................... 205/498 |
| 5,597,495 A * | 1/1997 | Keil et al. .................... 216/66 |
| 5,649,996 A | 7/1997 | Soffer et al. |
| 5,795,653 A | 8/1998 | Cuomo et al. |
| 5,914,434 A | 6/1999 | Soffer et al. |
| 5,961,813 A | 10/1999 | Gestermann et al. ....... 205/556 |
| 6,079,426 A | 6/2000 | Subrahmanyam et al. |
| 6,223,685 B1 | 5/2001 | Gupta et al. |
| 6,270,714 B1 | 8/2001 | Azran et al. |
| 6,374,831 B1 | 4/2002 | Chandran et al. |

(Continued)

FOREIGN PATENT DOCUMENTS

| | | |
|---|---|---|
| FR | 2627767 | 9/1989 |
| GB | 346774 | 4/1931 |

OTHER PUBLICATIONS

Nakayama et al, "Electrochemical fluorine source for ultrahigh vacuum dosing", Journal of Vacuum Science Technology A, vol. 18(5), Sep. 2000, pp. 2606-2607.*

(Continued)

*Primary Examiner*—Harry D. Wilkins, III
(74) *Attorney, Agent, or Firm*—Proskauer Rose LLP

(57) ABSTRACT

The invention relates to apparatus and methods for generating and recycling fluorine. The applicants recognized that a fluorine separator, used either alone or in combination with a plasma generator can produce sufficient quantities of fluorine at its point of use for thin film processing. The fluorine separator can take the form of a condenser, a membrane separation device, a fluorine ion conductor comprising a solid electrolyte, or a combination of the foregoing. In some embodiments, reaction products comprising fluorine are passed to the fluorine separator. In other embodiments, separated fluorine is passed, either alone or in conjunction with additional feed stock comprising fluorine, to a plasma generator. The fluorine separator allows fluorine to be recycled and waste products to be eliminated from the system.

24 Claims, 6 Drawing Sheets

U.S. PATENT DOCUMENTS

| | | | |
|---|---|---|---|
| 6,403,047 | B1 | 6/2002 | Norton et al. |
| 6,432,256 | B1 | 8/2002 | Raoux |
| 6,872,909 | B2 | 3/2005 | Holber et al. .......... 219/121.52 |
| 7,090,752 | B2 * | 8/2006 | Jacobson et al. ........... 204/252 |
| 2002/0062837 | A1 | 5/2002 | Miyanaga et al. |
| 2002/0134755 | A1 | 9/2002 | Goto et al. |
| 2003/0036272 | A1 | 2/2003 | Shamouilian et al. |
| 2004/0108202 | A1 | 6/2004 | Jacobson et al. ........... 204/263 |

OTHER PUBLICATIONS

Sridhar, K.R. et al., "Oxygen Production on Mars Using Solid Electrolysis," 25th International Conference on Environmental Systems (SAE Technical Paper Series951737. San Diego. California Jul. 10-13, 1995).

Siegele, S.H. et al., "On-Site Generation of High Purity Fluorine as a Safe and Economical Alternative for CVD Chamber Cleaning," Future FAB International, Issue 13, pp. 107-116 (Jul. 8, 2002).

Sobolev, B., "Improvement of a Chemical Sensor for Detection of Hydrogen Fluoride in Gaseous Environment and a Fluoride Generator for Its Calibration," International Science & Technology Center (Promising Research Abstract PRA-1204) (undated). Retrieved on Feb. 7, 2002 from the Internet: <URL: http://www.iste.ru/iste/db/pra.nsf/pran/1204, pp. 1-3.

Dagan, G. et al., "Carbon Membrane Separator for Elimination of $SF_6$ Emissions From Gas-Insulated Electrical Utilities," Carbon Membranes. Ltd. (Arava, Israel, undated). Retrieved on Oct. 31, 2002 from the Internet: <URL http://www.epa.gov/highgwpl/sf6/pdf/daganpo.pdf>.

"Microgen™ Fluorine Generators." Fluorine on Call. Ltd. Advertisement. pp. 1-3. Retrieved on Nov. 22, 2002 from the Internet: <URL: http://www.foeltd.com/foe_ad.htm>.

Sridhar, K.R., "Modeling of Transport Processes in a Solid Oxide Electrolyzer Generating Oxygen on Mars." University of Arizona, Dept. of Aerospace and Mechanical Engineering. Space Technologies Laboratory, pp. 411-419 (Tuscon, undated).

Communication Relating to the Results of the Partial International Search for International Patent Application No. PCT/US03/38721, date of mailing Oct. 8, 2004, 4 pages.

\* cited by examiner

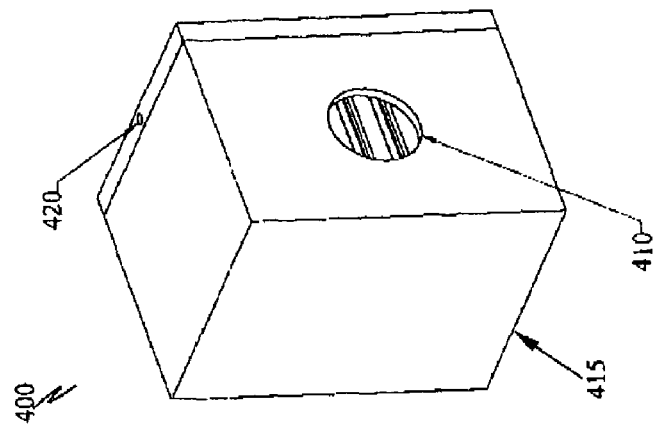
FIG. 4A
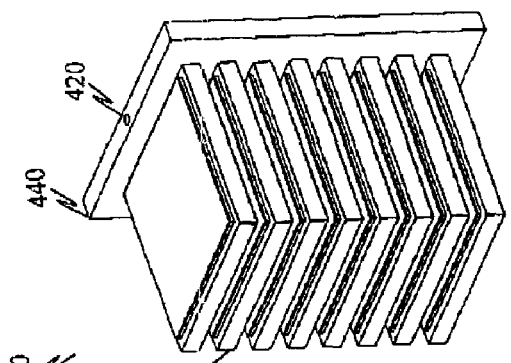
FIG. 4B
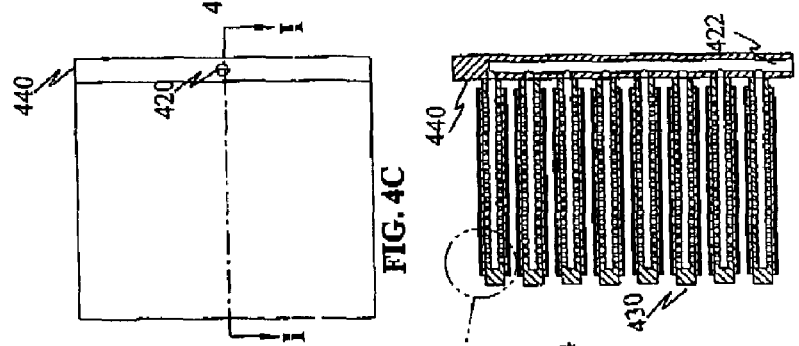
FIG. 4C
FIG. 4D
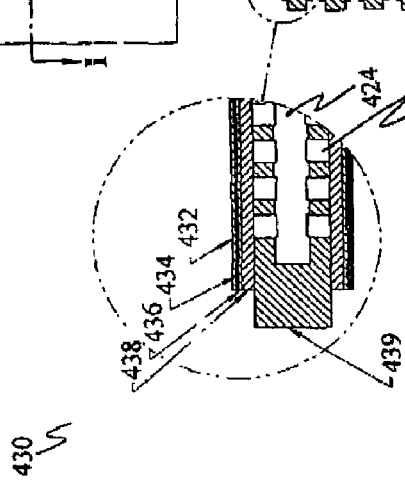
FIG. 4E

METHOD AND APPARATUS FOR FLUORINE GENERATION AND RECIRCULATION

TECHNICAL FIELD

This invention relates to fluorine generation and recirculation and, more particularly, fluorine generation and recirculation at its point of use.

BACKGROUND INFORMATION

Fluorine, in its atomic and molecular state, is highly reactive and toxic. Most laboratories prefer not to use fluorine due to the dangers and expense of the necessary safety equipment associated with its use. Some industries, nonetheless, find that fluorine fills an important role better than other known chemistries.

Traditionally, molecular fluorine is generated from HF electrolytically. $NF_3$ has also been used to generate fluorine, particularly in thin film processing industries, such as semiconductor and flat panel display fabrication. Both HF and $NF_3$, however, are toxic and require expensive special handling.

If fluorine could be generated from a nontoxic, inert compound that contains fluorine, the danger and expense associated with the use of fluorine could be substantially reduced. For example, the piping and distribution system for such a compound need not comply with the stringent requirements associated with the piping and distribution of HF or $NF_3$. The closer to its point of use that fluorine could be generated, the less danger its use would pose.

Moreover, if fluorine could be recovered from the byproducts of its use, then fluorine could be used more efficiently. Fluorine recovery would minimize the total amount of fluorine source compound required for a particular application. Fluorine recovery could also minimize the risks and costs associated with the distribution of fluorine.

Accordingly, there is a need to safely generate fluorine as close to its point of use as possible; a need to generate fluorine from a nontoxic, inert compound that contains fluorine; and a need to recover fluorine from the byproducts of its use.

SUMMARY OF THE INVENTION

The applicants recognized that a fluorine separator, used either alone or in combination with a plasma generator, can produce sufficient quantities of fluorine at its point of use for thin film processing. The fluorine separator can take the form of a condenser, a membrane separation device, a fluorine ion conductor comprising a solid electrolyte, or a combination of the foregoing.

The fluorine separator can be used with a variety of gases comprising fluorine—such as $F_2$, HF, $SF_6$, $NF_3$, $CF_4$, $C_2F_6$, $C_3F_8$, and other fluorine compounds. Of the gases comprising fluorine, $CF_4$, $C_3F_8$, $C_2F_6$, and $SF_6$, for example, may be considered inert transport mediums for fluorine. Moreover, the fluorine separator, again used either alone or in combination with a plasma generator, makes fluorine recirculation possible.

In general, in one aspect, the invention is an apparatus for producing a flux of atomic fluorine for use in a process chamber featuring a housing, an electrochemical cell, and an adapter. The housing has an inlet for receiving a gas comprising fluorine. The electrochemical cell has at least one electrode and, proximate to the at least one electrode, a fluorine ion conductor comprising a solid electrolyte. The electrochemical cell separates fluorine from the gas comprising fluorine. The electrochemical cell is at least partially disposed within the housing and has an outlet channel. The adapter connects the outlet channel to the process chamber. In one embodiment, the adapter connects the outlet channel to the process chamber via a plasma generator.

In various embodiments of the foregoing, the electrochemical cell forms a tube or a plate. In some embodiments of the foregoing, the electrode comprises a cathode and the cell further comprising an anode proximate to the fluorine ion conductor. In these embodiments, the anode may comprise a thin film. The thin film may be characterized by a porosity or a pattern that minimizes the formation of molecular fluorine at the anode. A thick conductive grid may be disposed relative to the thin film. In some embodiments, the anode comprises a porous nickel or stainless steel.

In general, in another aspect, the invention is an apparatus for generating fluorine gas featuring a plasma generator and a fluorine separator. The plasma generator has an inlet for receiving a feed stock comprising fluorine and an outlet. The plasma generator forms a plasma that dissociates the feed stock into reaction products. The fluorine separator has an inlet connected to the outlet of the plasma generator for receiving reaction products and a fluorine outlet. The fluorine separator may be a membrane separation device, a condenser, a fluorine ion conductor comprising a solid electrolyte, or a combination of the foregoing. The fluorine separator separates fluorine from the reaction products.

Embodiments of the foregoing apparatus may have a variety of additional elements or connections to achieve various purposes. For example, the apparatus may include a flow control device that directly or indirectly connects to the fluorine outlet of the fluorine separator. Similarly, embodiments of the apparatus may include a second plasma generator that directly or indirectly connects to the fluorine outlet. The inlet of the fluorine separator, in some embodiments, is connected to the outlet of the plasma generator via a process chamber. In one embodiment, the fluorine outlet is indirectly connected to the inlet of the plasma generator thereby enabling fluorine gas to be recycled. For example, the fluorine outlet may be connected to the inlet of the plasma generator via a buffer volume.

In general, in another aspect, the invention is an apparatus for producing a fluorine gas for use in a process chamber. The invention features a solid electrolyte for separating fluorine from a feed stock comprising fluorine, a pressure control mechanism, and an adapter. The solid electrolyte is partially electronically conductive, meaning that it conducts electrons to some extent, as well as ions, and has an inlet side for receiving the feed stock and an outlet side. (As used herein, "electronically conductive" refers to a medium that conducts electrons.) The pressure control mechanism is proximate to the inlet side of the solid electrolyte. The pressure control mechanism maintains a partial pressure of the feed stock on the inlet side of the solid electrolyte higher than the partial pressure of fluorine on the outlet side. The adapter connects the outlet side of the solid electrolyte to the process chamber, directly or via a plasma generator.

In a similar aspect, the invention is a method of producing a flux of atomic fluorine for use in a process chamber. In the method, a fluorine ion conductor comprising a solid electrolyte having an inlet side and an outlet side is provided. A feed stock comprising fluorine is received at the inlet side of the fluorine ion conductor. Fluorine is separated from the feed stock comprising fluorine with the fluorine ion conductor. Fluorine is provided to the process chamber from the outlet side of the fluorine ion conductor.

In general, in another aspect, the invention is a method for generating fluorine gas. A feed stock comprising fluorine is dissociating into reaction products with a plasma, and fluorine is separated from the reaction products with a fluorine separator. The fluorine separator is a membrane separation device, a fluorine ion conductor comprising a solid electrolyte, or a condenser.

In general, in another aspect, the invention is a method of recirculating fluorine gas. Exhaust from a process chamber is received. Fluorine is separated from a gas comprising fluorine with a fluorine ion conductor comprising a solid electrolyte. Molecular or atomic fluorine is compressed to drive recirculation.

Various embodiments of the foregoing methods further include one or more of the following steps: dissociating molecular fluorine into atomic fluorine with a plasma; providing atomic fluorine to the process chamber; or draining the unwanted products of the separating step away from the fluorine. The exhaust, in one embodiment, is chamber clean exhaust. In alternative embodiments, the compression may be accomplished with the fluorine ion conductor and/or a pump.

In some embodiments of the foregoing, pressure control is used to inhibit fluorine recombination on the outlet side of the fluorine separator. For example, in one such apparatus, a pressure control mechanism inhibits fluorine recombination on the outlet side. The pressure control mechanism may comprises a pump. Pressure on the outlet side of the fluorine separator may be maintained at or below 100 torr, or at or below 20 torr.

Similarly, in some embodiments of the foregoing, temperature control is used to inhibit fluorine recombination on the outlet side of the fluorine separator. For example, in one such apparatus, a temperature control mechanism controls the temperature of at least one surface. The surface may be that of the electrolyte or of the fluorine outlet channel.

The foregoing and other aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings in which:

FIGS. 4A, 4B, 4C, 4D, and 4E are different views of a fluorine separator based on the electrochemical cell of FIG. 3;

DESCRIPTION

Figure 1:
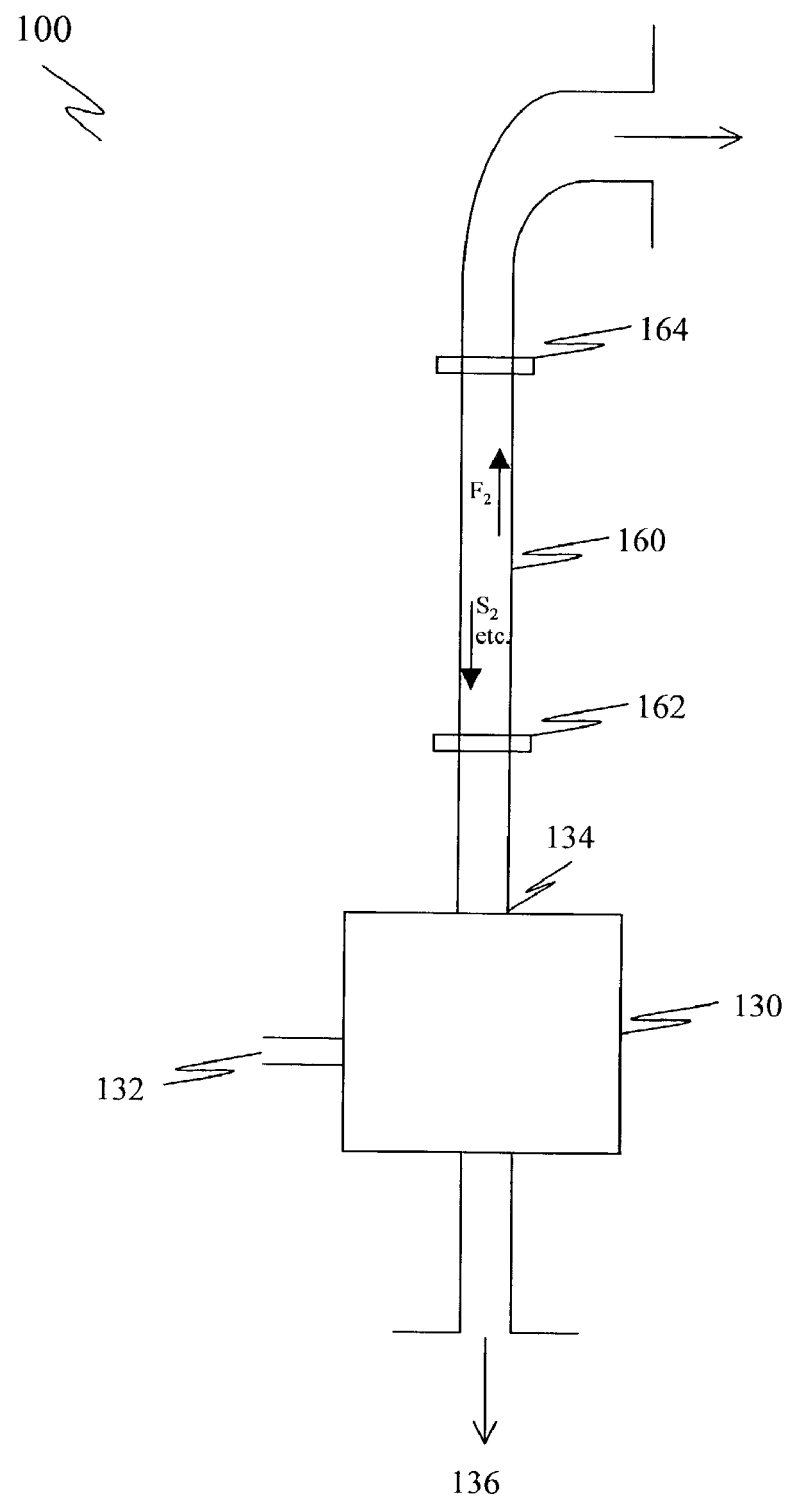
FIG. 1 is an apparatus for generating fluorine gas in accordance with one embodiment of the invention.

Referring to FIG. 1, an apparatus for generating fluorine gas 100, in accordance with one embodiment of the invention, features a plasma generator 130 and a fluorine separator 160. The plasma generator 130, in various embodiments, is a microwave plasma generator, an RF inductively coupled plasma generator, an RF toroidal inductively coupled plasma generator, or an RF capacitively coupled plasma generator. The plasma generator 130 may, for example, be an ASTRON™ or Rapid™ reactive gas generator. The plasma generator 130 comprises an inlet 132 and an outlet 134. A feed stock comprising fluorine is received at the inlet 132 of the plasma generator 130. The plasma generator 130 forms a plasma that dissociates the feed stock into reaction products. The reaction products exit the plasma generator 130 via the outlet 134. The plasma generator 130, in various embodiments, operates at or below atmospheric pressure.

In FIG. 1, the fluorine separator 160 is a condenser that cools and condenses at least some of the reaction products. The condenser 160 comprises an inlet 162 and a fluorine outlet 164. The inlet 162 of the condenser 160 is connected to the outlet 134 of the plasma generator. The condenser 160 receives reaction products via the inlet 162. In one embodiment, the condenser 160 further comprises an unwanted products outlet (not shown) out of which the unwanted products of condenser drain. In another embodiment, the unwanted products drain away from the fluorine via the plasma generator and a waste outlet 136.

In various applications, the feed stock is one or more gases comprising fluorine—such as $F_2$, HF, $SF_6$, $NF_3$, $CF_4$, $C_2F_6$, $C_3F_8$, and other fluorine compounds. Gases that are not necessarily recirculated, and may be freshly provided to a system, are referred to as feed stock. Of the gases comprising fluorine, $CF_4$, $C_2F_6$, $C_3F_8$ and $SF_6$, for example, may be considered inert transport mediums for fluorine. In various applications, the reaction products comprise a compound that includes sulfur or carbon. Where the feed stock comprises $SF_6$, the reaction products may include $F_2$, $S_xF_y$, and S in gas and liquid phases.

In various applications, a reactant gas is introduced to the plasma generator 130 in addition to the feed stock comprising fluorine. In these applications, the plasma generator 130 forms a plasma that dissociates or excites the reactant gas, as well as the feed stock comprising fluorine. The reactant gas may be introduced to the plasma generator 130 via the inlet 132. The reactive gas in some applications is $O_2$. The separation of fluorine from the reactions products may result in unwanted $S_2$ and/or $SO_2$.

In one embodiment of apparatus 100, the condenser 160 separates and delivers $F_2$, and a second plasma generator (not shown) forms a plasma that dissociates the $F_2$ into atomic fluorine. The atomic fluorine from such an embodiment may be introduced into a process chamber.

In some embodiments of apparatus 100, a mass flow control device (not shown) regulates the flow of fluorine through the outlet 164. The mass flow control device may be directly or indirectly connected to the fluorine outlet 164. The mass flow control device can be a pressure control device, can simply incorporate a pressure control device or may only regulate flow independent of pressure. The device may serve to control the pressure at the fluorine outlet 164.

In some embodiments of apparatus 100, the inlet 162 of the condenser 160 is connected to the outlet 134 of the plasma generator via a process chamber (not shown). This arrangement allows the condenser 160 to separate fluorine from the reaction products of the process chamber. When the fluorine outlet 164 is also connected to the inlet 132 of the plasma generator 130 via a pump or other compressing device, the apparatus 100 enables fluorine gas to be recycled. In one such embodiment, the fluorine outlet 164 is connected to the inlet 132 of the plasma generator 130 via a buffer volume (not shown). The buffer volume includes an enclosed volume along with appropriate control valves and sensors. The buffer volume can store a quantity of fluorine—so that there may be a delay before the fluorine is reused.

A method of generating fluorine gas features dissociating a feedstock comprising fluorine into reaction products with a plasma, and separating fluorine from the reaction products with a fluorine separator. The method may take advantage of the apparatus 100 of FIG. 1 or a group of elements with similar functions. For example, although the apparatus 100 of FIG. 1 features the condenser 160 to separate fluorine from the reaction products, the method does not require the condenser. The method may use a membrane separation device, a fluorine ion conductor comprising a solid electrolyte, a condenser, or a combination of the foregoing to accomplish the separation.

Figure 2:
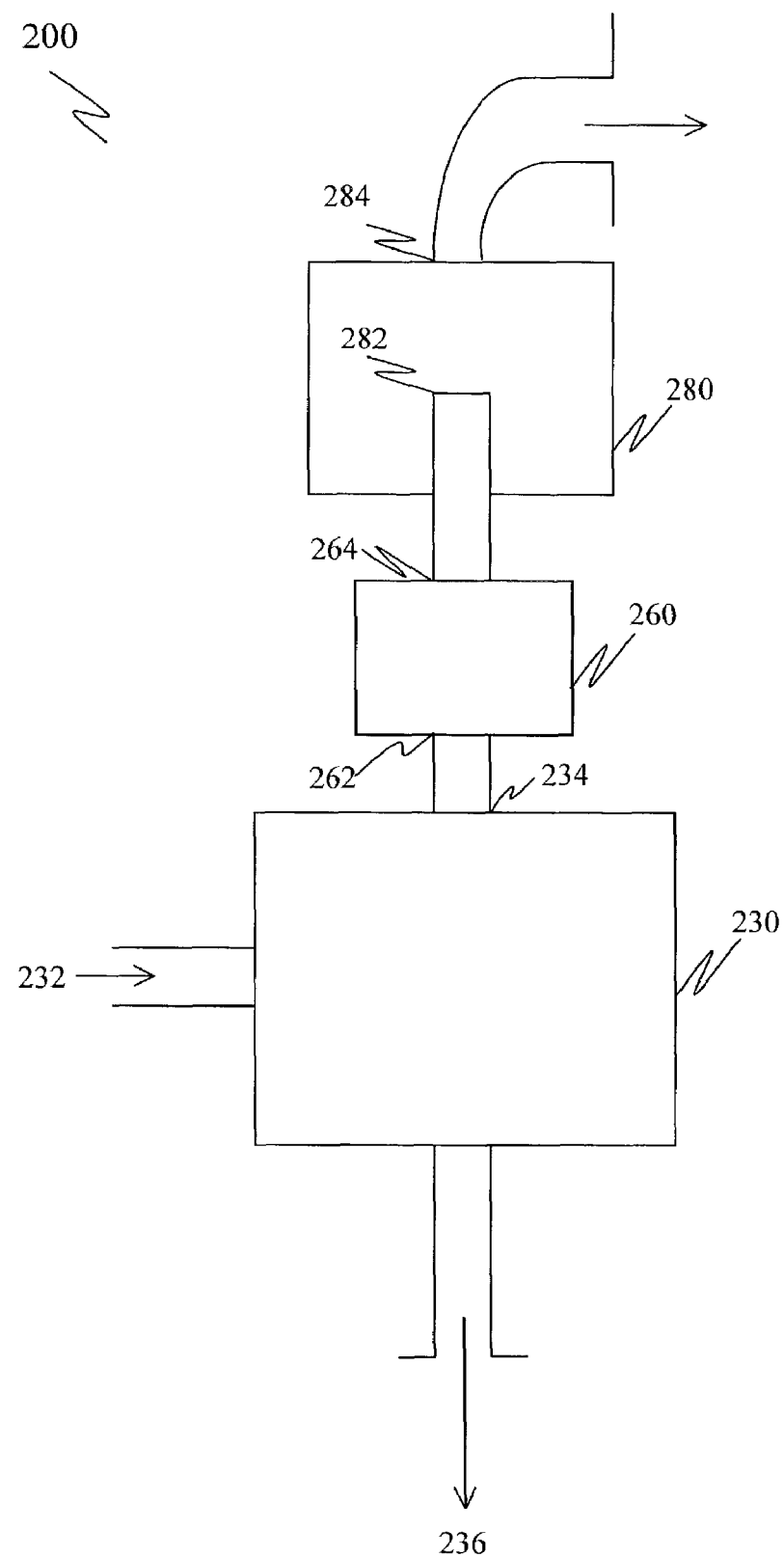
FIG. 2 is an apparatus for generating fluorine gas in accordance with another embodiment of the invention.

Referring to FIG. 2, an apparatus 200 for generating fluorine gas, in accordance with another embodiment of the invention, features a plasma generator 230, a first fluorine separator 260, and a second fluorine separator 280. The plasma generator 230 comprises an inlet 232 and an outlet 234, and is structurally and functionally similar to plasma generator 130 described with respect to FIG. 1. Likewise, the first fluorine separator 260 is a condenser that comprises an inlet 262 and an outlet 264, and that is structurally and functionally similar to the condenser 160 described with respect to FIG. 1. The condenser 160 can also serve the purpose of cooling the gas before it reaches the second separator 280.

In the embodiment depicted in FIG. 2, the second fluorine separator 280 is a membrane separation device. The membrane separation device 280 comprises an inlet side 282 and an outlet side 284. The inlet side 282 of the membrane separation device 280 is connected to the outlet 264 of the condenser 260. In one such embodiment, the membrane separation device 280 is used in conjunction with the condenser 260 because the condenser 260 is not completely effective in separating fluorine from the reaction products. Atomic fluorine dissociated by the plasma in the plasma generator 230 recombines into molecular flourine before reaching the membrane separation device 280. Accordingly, the membrane separation device 280 serves to separate molecular fluorine from the reaction products.

In one embodiment of FIG. 2, the membrane separation device 280 features a means for allowing particles with a diameter of about 1.4 Å, but not particles with a diameter substantially greater than 1.4 Å, to pass. Molecular fluorine has a diameter of diameter of about 1.4 Å, which is small in comparison to most of the other likely products of dissociation. For example, $SF_6$ has a diameter of about 5 Å and $O_2$ has a diameter of about 3.3 Å. In alternative embodiments, the membrane separation device 280 features a porosity or channels with the appropriate characteristic. In some such embodiments, the temperature of the membrane is controlled to establish the desired permeability in the membrane. In the embodiment of FIG. 2, a gradient in the partial pressure of fluorine between the inlet side 282 and an outlet side 284 of the membrane separation device 280 may be used, additionally or alternatively, to accelerate the passage.

In Carbon Membrane Separator for Elimination of $SF_6$ Emissions From Gas-Insulated Electrical Utilities, which is hereby incorporated by reference, Dagan et al. from Carbon Membranes, Ltd. of Arava, Israel describe the production of carbon molecular sieve membranes and their use to separate $O_2$ and $N_2$ from $SF_6$. Similar techniques may be used to produce a molecular sieve membrane to separate $F_2$ from other, likely larger, molecules and particles.

In general, the apparatus 200 of FIG. 2 may feature the same variations in embodiments and applications that were described with respect to the apparatus 100 of FIG. 1. Additionally, in an alternative embodiment of an apparatus for generating fluorine gas, a membrane separation device 280, such as described with respect to FIG. 2, replaces the condenser 160 described with respect to FIG. 1. In a second alternative embodiment, the apparatus 200 comprises a condenser 260, but does not incorporate the membrane separation device 280.

Figure 3:
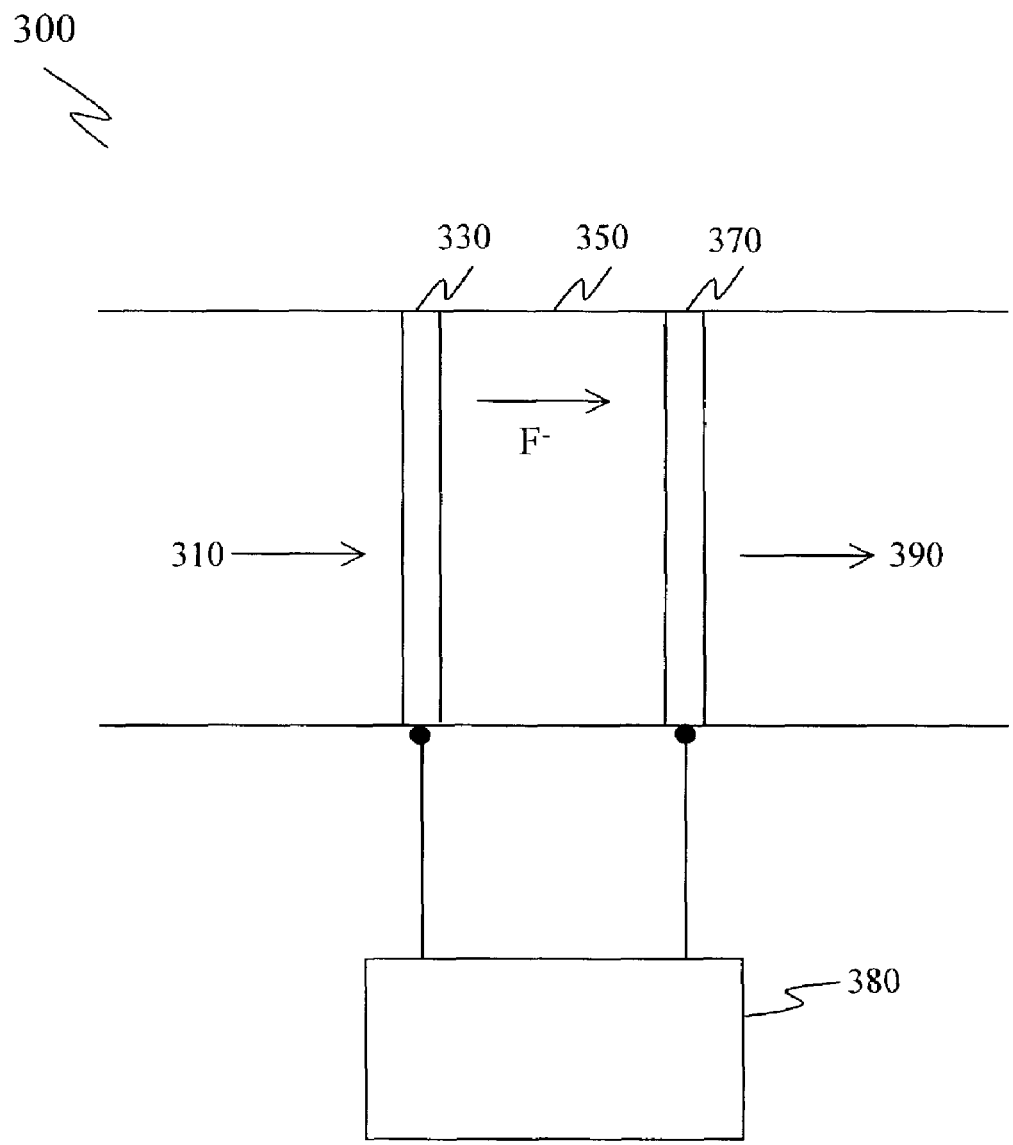
FIG. 3 is a general schematic of an electrochemical cell in accordance with one embodiment of the invention.

FIG. 3 illustrates a general schematic of an electrochemical cell 300 for separating fluorine from gas comprising fluorine as incorporated into an embodiment of the invention. FIG. 3 features an electrode (330 or 370) and a fluorine ion conductor 350 comprising a solid electrolyte proximate to the electrode. The solid electrolyte, in some embodiments, comprises $Pb_2Sn_2F_4$ The solid electrolyte, in some embodiments, is partially electronically conductive with diffused or distributed electronic conductivity. The electrode may be formed from any appropriate electrode material known in the art. In various embodiments, the cell 300 takes the form of a tube, a plate, or a disc.

In some embodiments, the cell 300 features a separate power supply 380 and a second electrode proximate to the solid electrolyte 350. The power supply 380 is electrically connected to both electrodes and thereby causes one electrode to act as a cathode 330 and the other to act as an anode 370.

In some embodiments, the anode 370 of FIG. 3 comprises a thin film. An anode film is thin, for purposes of the invention, if it allows fluorine ions and/or atoms to pass. The anode material, in such embodiments, may comprise porous nickel or Stainless Steel. The thin film, in various embodiments, is characterized by a porosity or pattern that has openings spaced to minimize the formation of molecular fluorine proximate the anode 370. In some embodiments, the anode 370 features a thick conductive grid. The grid improves heat dissipation and mitigates power loss. In some such embodiments, portions of a single thick conductive layer on the solid electrolyte are removed to create an anode 370 comprising a thin film and a thick conductive grid. In other embodiments, the thin film and the conductive grid form separate layers.

In another embodiment, the cell 300 alternatively comprises a means for applying an electrical field to a surface of the solid electrolyte 350. Fluorine ions can thereby be extracted directly from the surface of the solid electrolyte 350. In a similar embodiment, a thin, doped layer of the solid electrolyte 350 acts an anode 370 and the electrode acts as a cathode.

In operation, the solid electrolyte 350 of the cell 300 separates fluorine from a gas comprising fluorine. The fluorine is ionized, producing two negative ions, proximate to the cathode 330. Fluorine ions are then transported through the solid electrolyte 350 toward the anode 370. The influence of a field on the solid electrolyte 350 can accelerate the transportation. Power supply 380, for example, can create an electrical field across the solid electrolyte 350 that accelerates the transportation. Additionally or alternatively, a gradient in the partial pressure of fluorine between the cathode side 310 and the anode side 390 of the fluorine ion conductor 350 may accelerate the transportation.

In most applications, the fluorine ion gives up its electron to the anode 370, and then recombines with another fluorine atom to form molecular fluorine. In these applications, the cell 300 can be used to separate molecular fluorine from gas comprising fluorine, and to compress the molecular fluorine to the desired pressure. The cell 300 electrochemically transports the low pressure gas on the cathode side 310 of the cell 300 to a higher pressure on the anode side 390 of the cell 300. The use of the cell 300 in this fashion may eliminate the requirement for a separate, mass flow control device to compress the molecular fluorine.

In certain applications, the pressure and/or temperature at the anode side 390 of the ion conductor 350 are controlled to inhibit the formation of molecular fluorine. At an appropriately low pressure and/or high temperature, the fluorine atoms can be desorbed without recombination. The probability of two fluorine atoms coming together is reduced at low pressure and the time spent by an atom on a material surface, where recombination is most likely to occur, is reduced at high temperature. In some such applications, the pressure at the anode side 390 of the ion conductor 350 is maintained at or below 100 torr. In related applications, the pressure at the anode side 390 of the ion conductor 350 is maintained at or below 20 torr.

A difference in partial pressure of fluorine between the two sides of the electrochemical cell produces a potential difference, which drives ions from the high partial pressure side to the low partial pressure side. In such a case, one can provide a circuit from the anode to the cathode—thereby returning the electrons that were carried across the cell by the negative fluorine ions. This return circuit can be external to the cell (e.g., by a wire). Alternatively, the circuit can pass back through the cell if some electron conductivity is built into the electrolyte or cell structure.

FIGS. 4A, 4B, 4C, 4D, and 4E are different views of a fluorine separator 400 in accordance with one embodiment of the invention. FIG. 4A illustrates a three-dimensional view of the housing 415 of the fluorine separator 400. The housing 415 in the embodiment of FIG. 4A comprises an inlet 410 for receiving a gas comprising fluorine, a fluorine outlet 420, and an unwanted products outlet (not shown, but situated opposite the inlet 410). FIG. 4B illustrates the same three-dimensional view of the fluorine separator 400 shown in FIG. 4A, but with its housing 415 removed to reveal its internal structure. A number of plates 430 are mechanically attached to a supportive sidewall 440 that forms a component in the housing 415. Each plate 430 comprises a number of layers. FIG. 4C is a top view of the housing 415 of the fluorine separator 400 identifying the I–I' location. FIG. 4D is a cross-sectional side view of the internal structure of the fluorine separator 400 at the I–I' location. FIG. 4D illustrates the same plates 430 shown in FIG. 4B in a cross-sectional side view. The mechanical attachment of the plates 430 to the supportive sidewall 440 is again shown.

FIG. 4E is a more detailed cross-sectional side view of a single plate 430 within the internal structure of the fluorine separator 400. As FIG. 4E shows, the fluorine separator 400 shown in FIG. 4 comprises a plurality of electrochemical cells 300 as described with respect to FIG. 3. Each cell 300 is disposed within the housing 415. Each cell comprises an outer electrode 432, a solid electrolyte 434, and an inner electrode 436 on a metal mount 438 and a thermal mount 439. Both of the electrodes 432 and 436 allow the passage of fluorine ions. The metal mount 438 and the thermal mount 439 comprise buried gas channels 426 that connect to the cell 300. Each buried gas channel 426 also connects to a central gas channel 424 within the structural element 439 that supports the plate 430. The central gas channel 424 within each plate 430 connects to a central gas channel 422 within the sidewall 440 that routes fluorine to the fluorine outlet 420. As illustrated in the embodiment of FIG. 4E, each plate 430 may have an electrochemical cell on its top and bottom surface.

In operation, the inlet 410 of the fluorine separator 400 receives a gas comprising fluorine. The gas interacts with the electrochemical cells within the housing 415. Fluorine is separated from the gas, transported through the cells to a buried gas channel 426, to the central gas channel 424 within the plate, to the central gas channel 422 within the sidewall 440, and then to the fluorine outlet 420. Fluorine exits the fluorine separator 400 via the fluorine outlet 420. Typically, the fluorine separator 400 will produce a molecular fluorine flux at the fluorine outlet 420. As explained with respect to FIG. 3, however, the characteristics of the anode and the conditions on the anode side of the electrochemical cell may inhibit the formation of molecular fluorine, thereby allowing an atomic fluorine flux to be created at the fluorine outlet 420. The byproducts of the fluorine separation exit the outer housing of the fluorine separator 400 via the waste products outlet (not shown).

Various embodiments of fluorine separators comprising a solid electrolyte feature a temperature control mechanism that controls the temperature of at least one surface. The temperature control mechanism of the fluorine separator 400, for example, may be the thermal mount 439. The thermal mount 439 may control the temperature of a surface of the solid electrolyte 434, of the buried gas channel 426, and/or of the central gas channel 424 within the plate. The temperature control mechanism, in alternative embodiments, is active or passive. Temperature control can be useful in inhibiting the formation of molecular fluorine. Also, temperature control can optimize the ionic conductivity of the electrolyte.

In an embodiment for one application, an adapter (not shown) proximate to the fluorine outlet 420 connects the outlet 420 to a process chamber. The adapter may, for example, receive a pipe that connects to the process chamber. The fluorine produced by operation of the fluorine separator 400 is thereby provided to the process chamber. In one application, the flux of atomic fluorine from the fluorine separator 400 is used directly in a thin film process, such as chamber cleaning or product etching. Alternately, molecular fluorine from the fluorine separator is provided to the process chamber via a plasma generator that dissociates the molecular fluorine into atomic fluorine. The flux of fluorine from the fluorine separator 400 can also be used in other applications. These applications include fluorination of plastics and production of fluoride gases and materials.

The fluorine separator 400 can be used in the apparatus of FIG. 1 instead of condenser 160. Similarly, the fluorine separator 400 can also be used in the apparatus of FIG. 2 as the second fluorine separator 280. The fluorine separator 400 can also replace both the fluorine separator 280 and the plasma generator 230. This embodiment can be useful for feed stock and reactive gases that can be dissociated directly by the electrochemical cell at the inlet side of the fluorine ion conductor.

Figure 5:
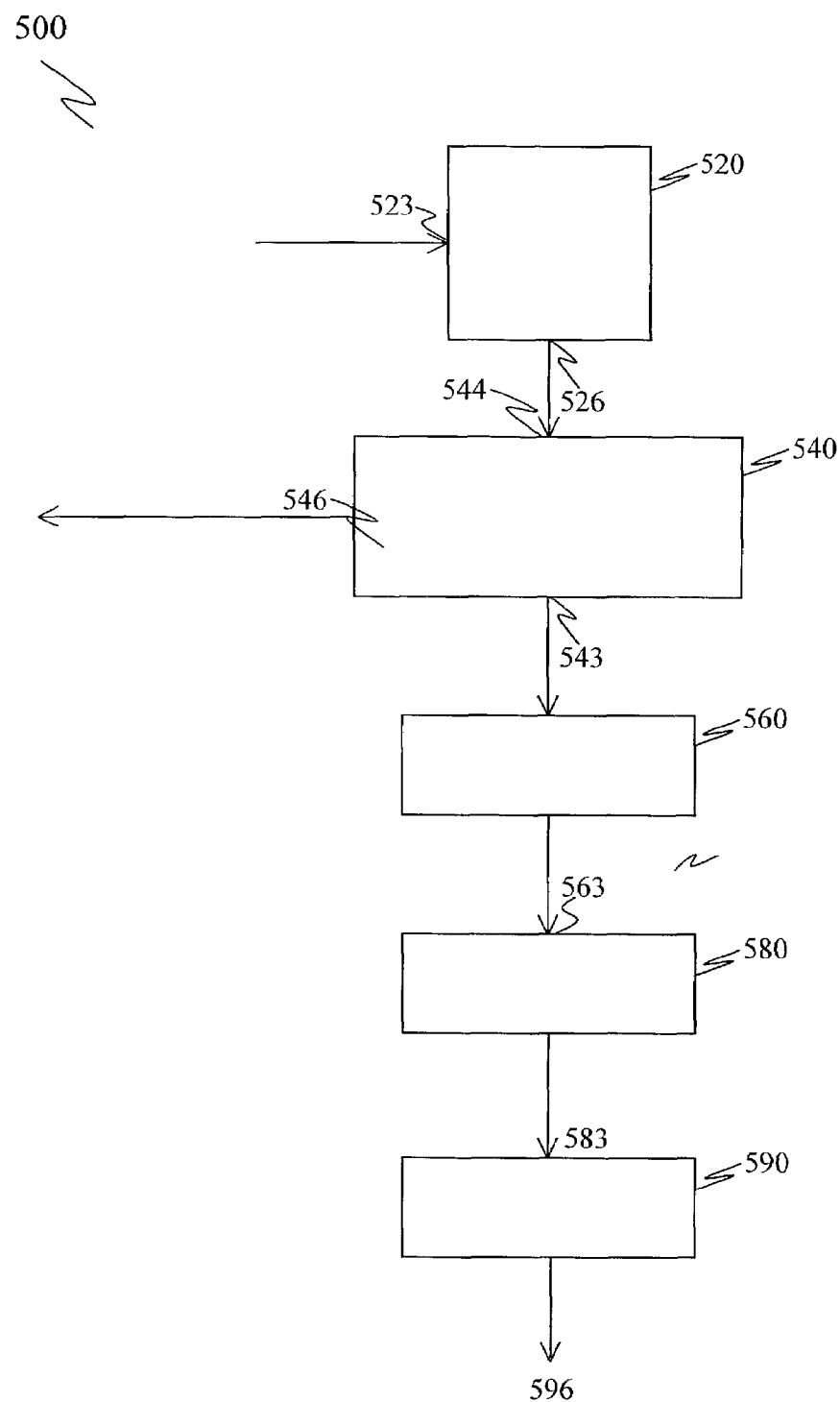
FIG. 5 is an apparatus for generating fluorine gas with a fluorine separator in accordance with the invention.

FIG. 5 is an apparatus 500 for generating fluorine gas in accordance with one embodiment of the invention. The apparatus can comprise an optional plasma generator 520 and a fluorine separator 540. The plasma generator 520 has an inlet 523 for a feed stock comprising fluorine and an outlet 526 for the reaction products. The plasma generator 520 is structurally and functionally similar to the plasma generator 130 described with respect to FIG. 1.

The fluorine separator 540 has an inlet 544, which connects to the outlet 526 of the plasma generator 520 for receiving reaction products, and a fluorine outlet 543. In various embodiments, the fluorine separator 540 is structurally and functionally similar to the condenser 160 described with respect to FIG. 1, the condenser 260 or the membrane separation device 280 described with respect to FIG. 2, or the electrochemical cell 300 described with respect to FIG. 3. In one embodiment, the fluorine separator 540 is structurally and functionally similar to the fluorine separator 400 described with respect to FIG. 4.

In operation, feed stock comprising fluorine, such as $SF_6$ or $CF_4$, is introduced into the plasma generator 520 via the inlet 523. In some applications, a reactive gas may also be introduced into the plasma generator 520 via the inlet 523. The plasma generator dissociates the feed stock comprising fluorine, and any reactive gas that may be present, into reaction products with a plasma. The reaction products may include molecular fluorine, atomic fluorine, carbon compounds, $SF_6$, $SF_4$, S, and $SO_2$ in addition to other products. The reaction products exit the plasma generator 520 via outlet 526 and are introduced into the fluorine separator 540 via inlet 544. The fluorine separator 540 separates fluorine from the reaction products and allows fluorine to pass through the fluorine outlet 543. The fluorine separator 540, in the embodiment of FIG. 5, also has an unwanted products outlet 546 through which unwanted products are allowed to pass.

In embodiments in which the fluorine separator 540 of FIG. 5 generates an atomic fluorine flux, further fluorine dissociation is unnecessary and fluorine from the fluorine separator 540 can be introduced into a process chamber 590 via ducts and gas distribution components such as a showerhead. The atomic fluorine may be used in the process chamber 590, for example, to clean the process chamber.

In embodiments in which the fluorine separator 540 of FIG. 5 generates a molecular fluorine flux, further fluorine dissociation may be necessary to ensure that fluorine reaches the process chamber 590 in its most effective form. In these embodiments, a second plasma generator 580 may be added to the apparatus 500. The second plasma generator 580 may again be structurally and functionally similar to the plasma generator 130 described with respect to FIG. 1.

In such embodiments, molecular fluorine is introduced into the second plasma generator 580 via an inlet 563. The second plasma generator 580 dissociates the molecular fluorine into atomic fluorine with a plasma. Due to the reactivity of atomic fluorine, it may be preferable to have the output of the second plasma generator 580 closely connected to the process chamber 590. In one embodiment, for example, the second plasma generator 580 is mounted directly onto the process chamber 590. In another embodiment, for example, the distance between the second plasma generator 580 and the process chamber 590 is minimized. In a third embodiment, equipment involved in the fluid flow is arranged so that the second plasma generator 580 is the equipment closest to the process chamber 590.

Figure 6:
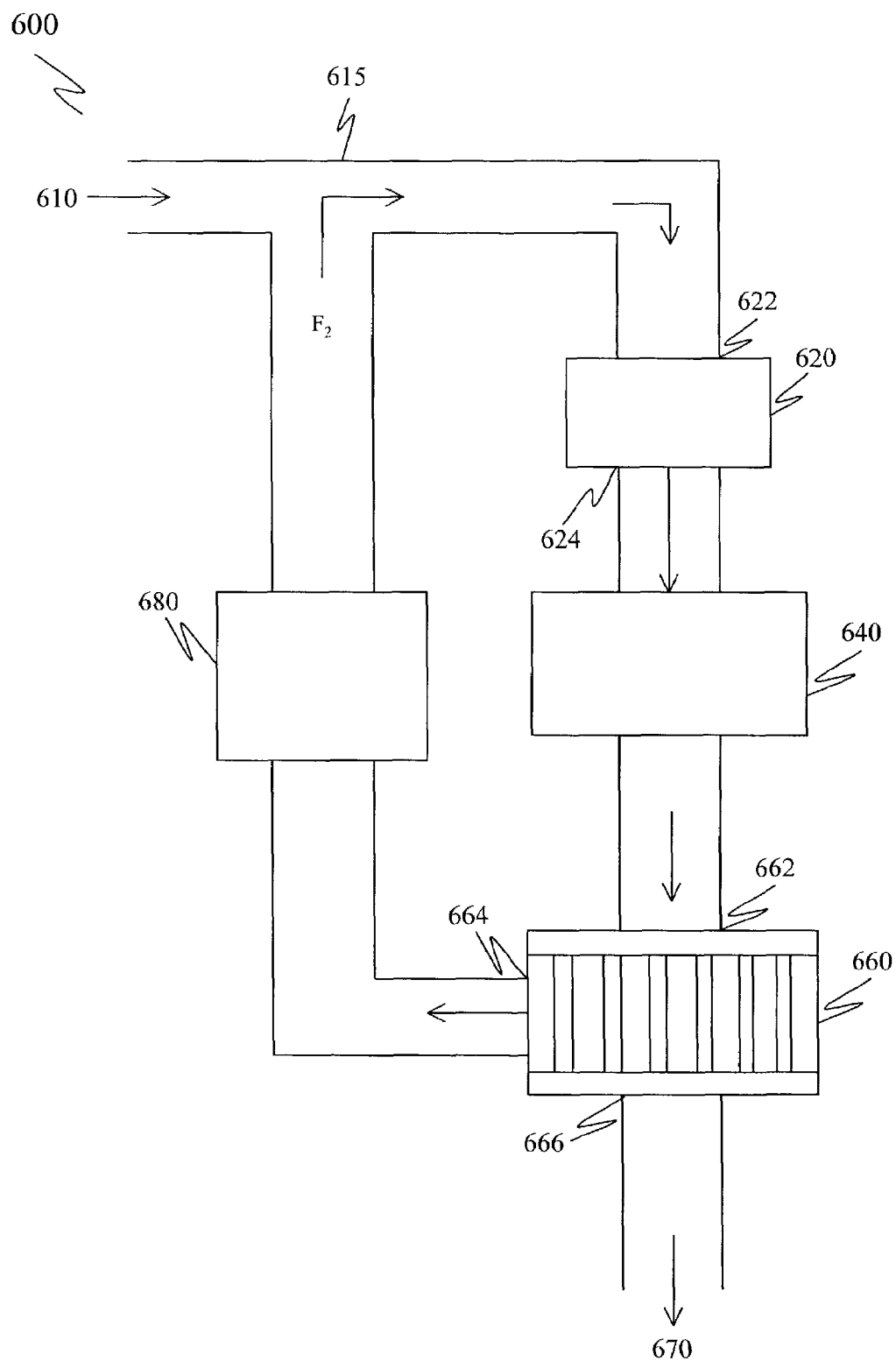
FIG. 6 is an apparatus for generating and recycling fluorine gas in accordance with the invention.

FIG. 6 schematically illustrates an apparatus 600 for generating and recycling fluorine gas in accordance with the invention. The apparatus 600 comprises a plasma generator 620, a fluorine separator 660, a means for introducing fluorine compound feedstock 610, a means for allowing waste products to be exhausted 670, and a plurality of connections that enable fluorine gas to be recycled. FIG. 6 illustrates an embodiment in which the apparatus 600 is used to generate fluorine for use in a process chamber 640 and to recycle fluorine from the process chamber exhaust.

The plasma generator 620 in apparatus 600 has an inlet 622 through which fluorine compound feedstock may be introduced. The plasma generator 620, which is structurally and functionally similar to the plasma generator 130 described with respect to FIG. 1, dissociates the feedstock into the products of dissociation. The plasma generator 620 also has an outlet 624 for the products of dissociation. As illustrated in FIG. 6, the fluorine compound feedstock need not be introduced into the apparatus 600 at the inlet 622.

The fluorine separator 660 in apparatus 600 has an inlet 662 and a fluorine outlet 664. As illustrated in FIG. 6, the inlet 662 may be connected to the outlet 624 of the plasma generator 620 via the process chamber 640. In other embodiments, the device that is consuming fluorine is interchanged with the plasma generator 620. The fluorine separator 660 separates fluorine from the other byproducts of the use of fluorine. In some embodiments, such as illustrated in FIG. 6, the fluorine separator 660 also has a waste products outlet 666 that enables byproducts of the fluorine separation to be exhausted from the apparatus 600. In other embodiments, the apparatus 600 includes a similar outlet near the fluorine separator 660 or at another appropriate location.

In various embodiments, the fluorine separator 660 is structurally and functionally similar to the condenser 160 described with respect to FIG. 1, the condenser 260 or the membrane separation device 280 described with respect to FIG. 2, or the electrochemical cell 300 described with respect to FIG. 3. In the embodiment illustrated in FIG. 6, the fluorine separator 660 comprises an array of tubes comprising electrochemical cells 300 such as described with respect to FIG. 3. In one embodiment, the fluorine separator 660 is structurally and functionally similar to the fluorine separator 400 described with respect to FIG. 4.

As illustrated in FIG. 6, the apparatus 600 comprises a connection between the fluorine outlet 664 of the fluorine separator 660 and the inlet 622 of the plasma generator 620. That connection enables the fluorine produced by the fluorine separator 660 to be recycled. The connection in some embodiments comprises a buffer volume 680.

The buffer volume accumulates fluorine so that it may be used at a rate and time different from the rate and time at which it is separated from the chamber exhaust. In the embodiment of FIG. 6, the fluorine produced by the fluorine separator 660 mixes with the feedstock comprising fluorine at a junction 615 prior to reaching the inlet 622 of the plasma generator 620. Additional gases for use in the apparatus 600, such as reactive gases, may also be introduced at the junction 615 or the inlet 622 of the plasma generator 620.

For recirculation, exhaust is received from the process chamber, fluorine is separated from the gas comprising fluorine with fluorine separator comprising a solid electrolyte, and molecular fluorine is compressed to drive the recirculation process. Additionally, in operation of the apparatus 600 of FIG. 6, feedstock comprising fluorine is received. A reactant gas may also be received. The plasma generator 620 dissociates the feedstock comprising fluorine into a variety of products including atomic fluorine with a plasma. The atomic fluorine is provided to the process chamber 640. The process chamber 640 uses atomic fluorine, in one embodiment to clean the chamber, and produces exhaust. The fluorine separator 660 separates fluorine from the exhaust. This fluorine is recirculated to the plasma generator 620 for reuse, while the unwanted products that are (at least partially) depleted of fluorine are exhausted from apparatus 600. Other embodiments may use a plurality of fluorine separators downstream of the process chamber 640.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. An apparatus for producing a flux of atomic fluorine for use in a process chamber, the apparatus comprising:
   a housing having an inlet for receiving a gas comprising fluorine;
   an electrochemical cell for separating fluorine from the gas comprising fluorine, the electrochemical cell at least partially disposed within the housing and having an outlet channel, the electrochemical cell comprising:
   at least one electrode comprising a cathode; and
   a fluorine ion conductor comprising a solid electrolyte proximate to the at least one electrode;
   an anode proximate to the fluorine ion conductor, comprising a thin film characterized by a porosity that minimizes the formation of molecular fluorine at the anode; and
   an adapter for connecting the outlet channel to the process chamber.

2. The apparatus of claim 1 wherein the electrochemical cell forms a tube.

3. The apparatus of claim 1 wherein the electrochemical cell forms a plate.

4. The apparatus of claim 1 wherein the solid electrolyte has a surface, the apparatus further comprising a means for applying an electrical field to the surface of the solid electrolyte to extract fluorine ions directly from the surface.

5. The apparatus of claim 1 wherein the anode comprises a thick conductive grid disposed relative to the thin film.

6. The apparatus of claim 1 wherein the anode comprises porous nickel.

7. The apparatus of claim 1 wherein the anode comprises porous stainless steel.

8. The apparatus of claim 1 further comprising a pressure control mechanism for inhibiting fluorine recombination at the outlet channel.

9. The apparatus of claim 8 wherein the pressure control mechanism comprises a vacuum pump for maintaining the pressure at the outlet channel at or below 100 torr.

10. The apparatus of claim 9 wherein the pressure control mechanism comprises a vacuum pump for maintaining the pressure at the outlet channel at or below 20 torr.

11. The apparatus of claim 1 further comprising a temperature control mechanism for controlling the temperature of at least one surface of at least one of the electrolyte and the outlet channel.

12. The apparatus of claim 1 wherein the adapter connects the outlet channel to the process chamber via a plasma generator.

13. An apparatus for producing a flux of atomic fluorine for use in a process chamber, the apparatus comprising:
   a housing having an inlet for receiving a gas comprising fluorine;
   an electrochemical cell for separating fluorine from the gas comprising fluorine, the electrochemical cell at least partially disposed within the housing and having an outlet channel, the electrochemical cell comprising:
   at least one electrode comprising a cathode; and
   a fluorine ion conductor comprising a solid electrolyte proximate to the at least one electrode;
   an anode proximate to the fluorine ion conductor, comprising a thin film characterized by a pattern that minimizes the formation of molecular fluorine at the anode; and
   an adapter for connecting the outlet channel to the process chamber.

14. The apparatus of claim 13 wherein the electrochemical cell forms a tube.

15. The apparatus of claim 13 wherein the electrochemical cell forms a plate.

16. The apparatus of claim 13 wherein the solid electrolyte has a surface, the apparatus further comprising a means for applying an electrical field to the surface of the solid electrolyte to extract fluorine ions directly from the surface.

17. The apparatus of claim 13 wherein the anode comprises a thick conductive grid disposed relative to the thin film.

18. The apparatus of claim 13 wherein the anode comprises porous nickel.

19. The apparatus of claim 13 wherein the anode comprises porous stainless steel.

20. The apparatus of claim 13 further comprising a pressure control mechanism for inhibiting fluorine recombination at the outlet channel.

21. The apparatus of claim 13 wherein the pressure control mechanism comprises a vacuum pump for maintaining the pressure at the outlet channel at or below 100 torr.

22. The apparatus of claim 20 wherein the pressure control mechanism comprises a vacuum pump for maintaining the pressure at the outlet channel at or below 20 torr.

23. The apparatus of claim 13 further comprising a temperature control mechanism for controlling the temperature of at least one surface of at least one of the electrolyte and the outlet channel.

24. The apparatus of claim 13 wherein the adapter connects the outlet channel to the process chamber via a plasma generator.

* * * * *

UNITED STATES PATENT AND TRADEMARK OFFICE
CERTIFICATE OF CORRECTION

PATENT NO. : 7,238,266 B2 Page 1 of 1
APPLICATION NO. : 10/313516
DATED : July 3, 2007
INVENTOR(S) : Smith et al.

It is certified that error appears in the above-identified patent and that said Letters Patent is hereby corrected as shown below:

In claim 21, column 12, line 41, delete "torn" and insert --torr--

Signed and Sealed this

Fourteenth Day of August, 2007

JON W. DUDAS
*Director of the United States Patent and Trademark Office*